THOMAS W MARTINEK
INVENTOR.

BY *his Attorney*

July 15, 1969  T. W. MARTINEK  3,454,981
SHIRRING APPARATUS AND RESULTING PRODUCT
Filed Jan. 24, 1966  3 Sheets-Sheet 2
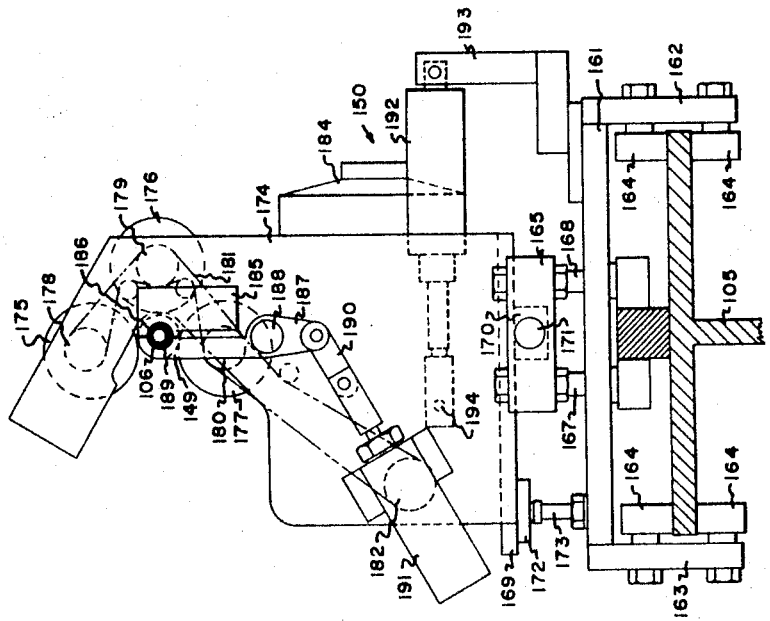
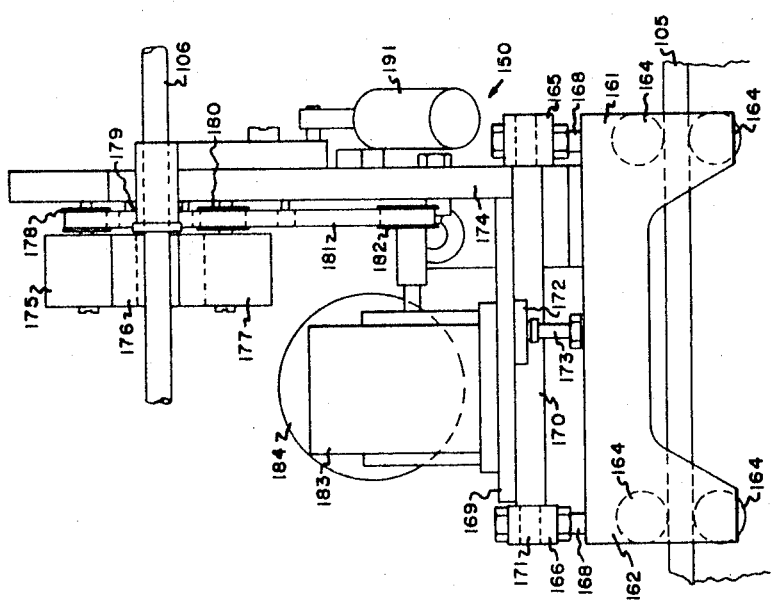
THOMAS W MARTINEK
INVENTOR.
BY *his Attorney*

July 15, 1969  T. W. MARTINEK  3,454,981
SHIRRING APPARATUS AND RESULTING PRODUCT
Filed Jan. 24, 1966  3 Sheets-Sheet 3
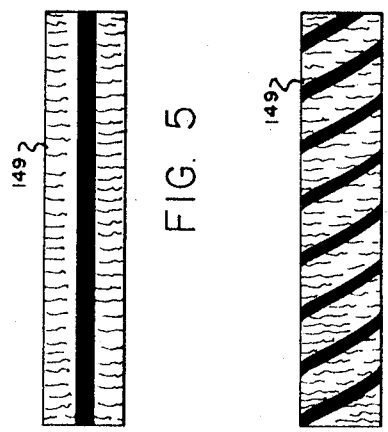
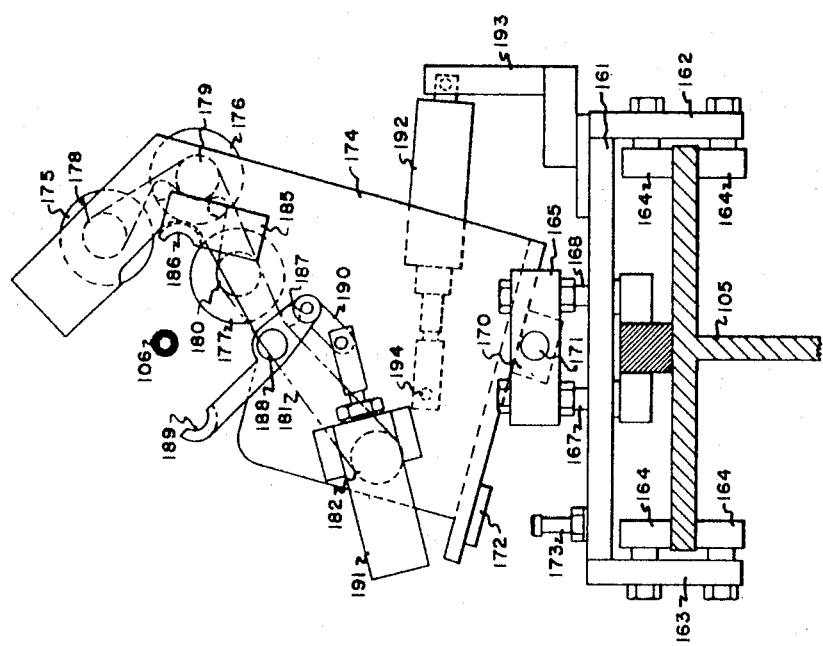
THOMAS W MARTINEK
*INVENTOR.*
BY *Neal J. Mosely*
*his Attorney*

United States Patent Office 3,454,981
Patented July 15, 1969

3,454,981
SHIRRING APPARATUS AND RESULTING
PRODUCT
Thomas W. Martinek, Danville, Ill., assignor to Tee-Pak,
Inc., Chicago, Ill., a corporation of Illinois
Filed Jan. 24, 1966, Ser. No. 536,227
Int. Cl. A22c *13/00*
U.S. Cl. 17—42                                          7 Claims

ABSTRACT OF THE DISCLOSURE

In the shirring of flexible casing, isometric irregularities in casing are equalized by engaging the shirred casing with rotary means to cause the same to rotate about the shirring mandrel.

---

Figure 1:
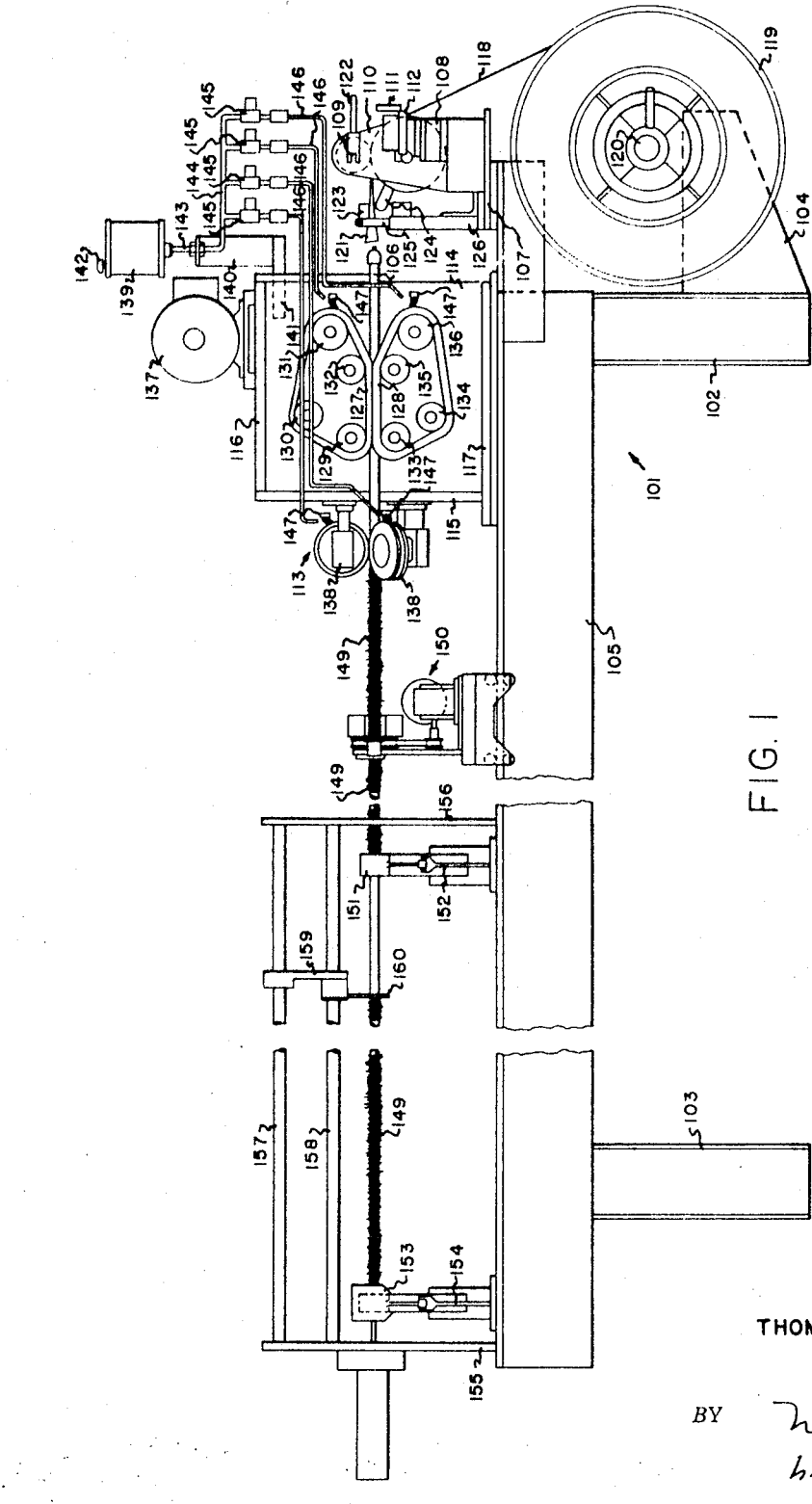

This invention relates to new and useful improvements in the shirring of artificial sausage casings and more particularly to the equalization of asymmetric irregularities in casing during shirring.

Artificial sausage casings, particularly casings formed of regenerated cellulose, are prepared as hollow thin-walled tubes of very great length. For convenience in handling, these casings are shirred from lengths ranging from 40 to 160 ft. or more down to a shirred and compressed length of the order of a few inches, e.g., 8–27 in. An early type shirring machine and the resulting shirred product are shown in Dietrich U.S. Patent 2,010,626. Improved forms of shirring machines and the products thereof are shown in Korsgaard U.S. Patent 2,583,654; Blizzard et al. U.S. Patents 2,722,714; 2,722,715; and 2,723,201; Gimbel U.S. Patent 2,819,488; Matecki U.S. Patents 2,983,949, and 2,984,574; and Ives U.S. Patents 3,112,517 and 3,184,786.

In the shirring of artificial sausage casings irregularities often occur which result in the formation of distorted or bowed strands of shirred casing. The misalignment of the shirring mandrel, with the result that more casing is shirred to one side than to another, may result in the formation of a bowed shirred strand of casing. Likewise, the shirring of a casing having a non-uniform wall thickness may result in the formation of an irregular or bowed strand due to the added wall thickness of casing along one particular portion of the shirred strand. Thus, a casing which has been extruded slightly off center so that the wall of the casing is thicker on one side than on another may produce an irregular or bowed strand in shirring. It should also be noted that a casing which is completely uniform in manufacture may present a serious problem in shirring if the casing has been provided with a printed legend extending longitudinally of the casing. Many customers require advertising material to be printed on casings which are to be used in the preparation of their sausage products and the printed material on the casing makes the wall of the casing thicker on one side than on the remainder of the unprinted portion. A printed casing cannot be shirred on ordinary shirring equipment to produce a satisfactory straight shirred strand because of the added thickness of the casing in the printed areas.

It is, therefore, one object of this invention to provide a new and improved shirred casing having a pleat distribution which compensates for irregularities in wall thickness of the casing and for irregularities in positioning of the shirring mandrel.

Another object of this invention is to provide a new and improved method for producing shirred artificial sausage casing which results in a more uniform distribution of the shirred casing pleats to compensate for irregularities in wall thickness of the casing and for irregularities in the spacing of the casing in relation to the shirring mandrel and the shirring means during the shirring process.

A further object of this invention is to provide a new and improved apparatus for shirring artificial sausage casing to produce a more uniform distribution of shirred pleats and to compensate for irregularities in the production of the casing or in the shirring thereof.

A feature of this invention is the provision of a new and improved shirred and compressed artificial sausage casing having the shirred pleats distributed uniformly around the shirred strand with the pleats displaced helically from one another to the extent of at least 0.5–10 turns per inch of shirred and compressed casing.

Another feature of this invention is the provision of a new and improved method for producing shirred artificial sausage casing having a more uniform displacement of the casing pleats wherein the casing is engaged with a rotating driving means to rotate the casing around the shirring mandrel while restraining the casing longitudinally for compaction by the shirring means.

Another feature of this invention is the provision of a new and improved apparatus for shirring casing to produce a more uniform distribution of shirred pleats around the shirred casing strand which comprises a casing rotating means engageable with the shirred casing to cause the same to rotate about a shirring mandrel while holding the casing back against longitudinal movement and providing for compaction of the shirred pleats by the shirring means.

Other objects and features of this invention will become apparent from time to time throughout the specification and claims as hereinafter related.

SUMMARY OF THE INVENTION

This invention is based upon the discovery that the distribution of shirred pleats in a shirred strand of artificial sausage casing can be made more uniform by rotation of the casing during the shirring process. In particular, it has been found that the casing should be rotated while being retarded against longitudinal movement so that the casing is twisted and simultaneously compacted, thus distributing irregularities in the casing around the periphery of the shirred strand. In the case of artifiical sausage casing having an asymmetric irregularity in wall thickness, such as that produced by printing extending longitudinally of the casing, the casing must be twisted during shirring at a speed sufficient to produce a twist in the helical shirring pattern, the casing being twisted to the extent of 0.5–10 turns per in. of shirred and compressed casing. The novel shirred product having a twist of 0.5–10 turns per in. of shirred and compressed casing superimposed upon the normal helical shirring pattern is produced in accordance with the method of this invention and using the apparatus designed to carry out that method. This invention also comprises a new and improved apparatus for rotating shirred strand of casing about a shirring mandrel while simultaneously retarding the advance of the shirred casing to provide for compaction of the twisted and shirred casing. The apparatus includes one or more rotary casing twisting wheels or rolls engageable with the surface of the shirred strand of casing to cause the same to rotate on the shirring mandrel. The apparatus includes means for rotating the driving rolls and for moving the same into and out of engagement with the shirred casing strand and includes means to retard the longitudinal movement of the shirred casing during the rotation of the shirred strand.

In the accompanying drawings, to be taken as a part of this specification, there is clearly and fully illustrated a preferred embodiment of this invention, in which drawings, FIG. 1 is a view in elevation of a shirring machine including a novel casing rotating or casing twisting means, FIG. 2 is a detail view in front elevation of the casing twisting device shown in the apparatus of FIG. 1, FIG. 3 is a detail view in right elevation of the casing rotating or casing twisting apparatus shown in FIG. 2, FIG. 4 is a view of the apparatus shown in FIG. 3 moved to a position out of engagement with the shirring mandrel and the shirred strand of casing, FIG. 5 is a plan view of a shirred strand of casing produced on an apparatus not including the casing twisting or casing rotating device shown in FIGS. 1 to 4, and FIG 6 is a plan view of a shirred strand of casing produced by the apparatus shown in FIGS. 1 to 4.

Referring to the drawings by numerals of reference and more particularly to FIG. 1 there is shown a general assembly of a shirring machine (without some of the details and control features) incorporating the essential features of this invention. In the shirring machine there is provided a frame which is generally of an angle iron and plate welded construction. Frame 101 includes vertically extending angles 102 and 103 and supporting member 104. At the upper edge of the frame 101 are horizontally extending members including an H beam 105 on which the shirring mechanism is supported. On beam 105, there is supported a plate 107 which carries measuring roll 108 and squeeze roll 109. Rolls 109 and 108 are mounted on support plates 110. Cooperating with measuring roll 108 is a metering disc 111 which cooperates with measuring limit switch 112 for stopping further operation of the shirring head when a predetermined length of casing has been shirred.

The shirring head, which is generally designated as 113, is supported by upwardly extending plates 114 and 115 and horizontally extending supporting plates 116 and 117. Shirring head 113 is arranged to receive relatively thin-walled synthetic sausage casing 118 from reel 119 which is rotatably mounted on shaft 120 supported on supporting member 104. As the casing 118 comes from reel 119, it is flat in the form of reelstock and passes between the measuring roll 108 and squeeze roll 109 and then is inflated as shown at 121. The casing is broken away following the inflated portion at 121 to show the shirring mandrel. The casing actually passes over the shirring mandrel in the inflated form and through the shirring apparatus as subsequently described.

Squeeze roll 109 is adjustable by lever 122 for initial threading of casing into the machine. The inflated casing is fed over shirring mandrel 106 and passes between upper and lower rollers 123 and 124. Roller 123 operates a tear limit switch which stops the shirring head in the event that the casing is torn, and roller 124 limits the downward movement of roller 123 when the casing is deflated. The casing also passes between vertically extending guide rollers 125 mounted on vertically extending arms 126 supported on plate 107.

The inflated casing 121 next passes between upper and lower feed belts 127 and 128 which cooperate to form a closed circular passage which assists in feeding the casing of the shirring wheels. Feed belt 127 is guided and driven by rollers 129, 130, 131 and 132. Feed belt 128 is driven in coordination with belt 127 by rollers 133, 134, 135 and 136. The drive rollers for the belts 127 and 128 may be driven by motor 137 mounted on plate 116 at the upper end of the shirring head 113 or may be driven by a separate motor (not shown). The belts 127 and 128 perform the dual function of feeding the inflated casing 121 to the shirring wheels and applying oil or other lubricant to the exterior of the casing to reduce frictional wear on the casing and on the shirring wheels.

The inflated casing 121 is fed into a plurality of shirring wheels 138 which are mounted on end plate 115. Shirring wheels 138 are driven by motor 137 or by any other suitable power source. Shirring wheels 138 do not show the details of the shirring teeth construction but can be in the configuration of the shirring wheels shown in the Matecki patents or in the configuration of the shirring lugs shown in the Blizzard et al. patents, or any other suitable design. The casing 121 is shirred on the mandrel 106 by wheels 138 and the shirred product removed by the portion of the apparatus to the left of the shirring wheels which will be subsequently described.

A lubricant storage tank 139 is supported by plates 140 and 141 and is secured on shirring head plates 114. The lubricant storage tank 139 has an inlet opening 142 and a bottom outlet opening connected to tubing 143 which is in turn connected to a manifold 144. Manifold 144 is connected to a plurality of valves 145 and outlet tubes 146 which are arranged to supply oil or other suitable lubricant to brushes 147 which are positioned for engagement with the feed belts 127 and 128 and with the shirring wheels 138. The lubricant which is fed from storage tank 139 is applied uniformly to the casing by the belts 127 and 128 and shirring wheels 138 and prevents abrasive damage to the casing and reduces wear on the shirring wheels.

The shirred casing, designated 149, leaving shirring wheels 138 is engaged by a holdback mechanism 150 which will be described more fully hereinafter. Holdback mechanism 150 is movably supported on H beam 105 and moves longitudinally of the shirring machine. Holdback mechanism 150 is operable to retard the longitudinal movement of shirred casing 149 so that the casing is more thoroughly compacted by the shirring wheels 138. Holdback mechanism 150 also includes a mechanism, to be described more fully hereinafter, for rotating the shirred casing to distribute irregularities in the casing around the shirred strand. To the left of holdback mechanism 150 the apparatus is broken to reduce the excessive length of the machine to enable it to be shown in the drawing. The shirred casing strand 149 is shown as extending to the edge of supporting clamp 151. Clamps 151 support mandrel 106 and are operated by actuators 152 which are driven by pneumatic actuators (not shown). Clamps 151 are also provided with connections to an exterior compressed air source and function to introduce compressed air through the mandrel 106 for inflating the casing as shown at 121. At the extreme left end of the shirring machine there are shown supporting clamps 153 which are actuated by actuators 154 driven by pneumatic actuators (not shown). Clamps 153 support mandrel 106 when clamps 151 are opened for movement of a shirred strand of casing away from the shirring portion of the machine. Clamps 153 are opened at a time when clamps 151 are closed and the casing has been thoroughly compressed. When clamps 153 are opened the shirred strand of casing is removed from the apparatus. The shirring machine is provided also with upright supports 155 and 156 on which there are supported longitudinally extending rods 157 and 158. A compression member 159 is mounted for longitudinal movement on rods 157 and 158 and has a finger 160 which is engageable with the end of a portion of shirred casing 149 to compress the same against clamps 153.

In operation, the casing is shirred by shirring wheels 138 as indicated at 149 and is partially compacted against holdback mechanism 150. Periodically, holdback mechanism 150 is opened to allow casing to move past it and clamps 151 are opened to permit the shirred and partially compacted casing 149 to be moved to a point where the casing is further compressed by compression mechanism 159. Compression mechanism 159 is moved to the right to engage the end of shirred casing 149 and then is moved to the left to compress the casing against clamps 153. Periodically, clamps 153 are opened to allow the shirred and compressed casing to be removed from mandrel 106.

As previously noted, the holdback mechanism 150 is provided with a mechanism for rotating the shirred casing strand as it leaves shirring wheels 138 to distribute irregularities in the casing around the periphery of the shirred strand. This rotating mechanism can compensate for irregularities in the positioning of shirring mandrel 106 and for irregularities in wall thickness of the casing being shirred. In particular, the mechanism is most useful in the shirring of casing having printing extending longitudinally thereof which casing tends to bow upon shirring due to the added thickness of the wall resulting from the printing. The casing rotating mechanism on holdback mechanism 150 is shown in more detail in FIGS. 2, 3 and 4 of the drawings.

Holdback mechanism 150 includes supporting base 161 having downwardly extending plates 162 and 163 on which there are supported a plurality of rollers 164 which support the mechanism for longitudinal movement along beam 105. It should be noted that the view of the mechanism in FIG. 2 of the drawings is from the rear of the holdback device 150 as seen in FIG. 1.

At opposite ends of support member 161 there are provided supporting pivot members 165 and 166 which are supported on adjustable supporting screws 167 and 168. Positioned between pivot support members 165 and 166 is a support plate 169 having a bar member 170, of rectangular cross section, secured thereto and provided with a longitudinally extending bore through which there extends a rod 171 (extending also through pivot members 165 and 166) for supporting plate member 169 for pivotal movement. Plate member 169 is also provided with an abutment member 172 which engages adjustable screw 173 for leveling plate member 169 in its initial position.

From plate member 169 there extends upwardly a supporting plate member 174 which supports the rotary actuating mechanism of the holdback device 150. At the upper end of plate member 174 there are provided a plurality of rubber drive rolls 175, 176 and 177 which are supported for rotary movement thereon and are provided with drive pulleys 178, 179 and 180, respectively. The drive pulleys for rubber drive rollers 175, 176 and 177 are driven by a continuous belt 181 which is driven by pulley 182 operated by speed reducer 183 which is in turn driven by an electric motor 184.

Plate 174 has a guide plate 185 secured thereon with an arcuate portion 186 positioned to engage mandrel 106. Plate 174 also has a lever member 187 pivotally mounted thereon as indicated at 188 and having an arcuate portion 189 at its upper end engageable with the mandrel 106 adjacent to the arcuate portion 186 of plate member 185. When lever member 187 is positioned as shown in FIG. 3 with arcuate portion 189 located adjacent to arcuate portion 186 of plate member 185 the lever 187 and plate member 185 define an abutment for holding back the shirred casing 149 coming off the shirring wheels 138 to cause the casing to be further compacted. The clearance between arcuate portions 186 and 189 and the surface of mandrel 106 is preferably less than the thickness of the casing film being shirred so that the casing film cannot extend into said clearance and become entangled. Thus, arcuate portions 186 and 189 function as a split collar or bearing for mandrel 106 and support and align the mandrel while performing the function of holding back the shirred casing whether or not the shirred strand is being rotated.

Lever 187 is connected by linkage 190 to pneumatic actuator 191. Actuator 191 is operable to move lever 187 into and out of the position shown in FIG. 3. The apparatus is also provided with pneumatic actuator 192 which is pivotally supported on support 193 on base plate 161. Actuator 192 is also pivotally connected as at 194 to vertically extending plate 174. The actuation of actuator 192 is coordinated with the actuation of actuator 191 so that the entire rotating mechanism is pivoted out of engagement with mandrel 106 at the same time that lever 187 is moved out of engagement with the mandrel. In FIG. 4 of the drawing the apparatus is shown in a position out of engagement with mandrel 106, in which position the shirred casing may be severed from the casing following it for movement past clamps 151 to a position where the casing may be further compressed by compressor member 159.

OPERATION

In operation, this apparatus functions as a conventional casing shirring machine with the casing rotating device superimposed on the operation of the machine. Casing 118 is withdrawn from storage reel 119, passes through rolls 108 and 109 and is inflated as indicated at 121. The inflated casing 121 passes over mandrel 106 and is picked up by feed-in belts 127 and 128 which feed the casing to shirring wheels 138. Feed-in belts 127 and 128 and shirring wheels 138 are lubricated by application of oil or other suitable lubricant through the previously described lubricating system. Shirring wheels 138 shirr the casing into a plurality of pleats having a uniform pattern displaced helically around the casing. While the shirred pleats are normally displaced around the casing in forming the shirred strand of casing 149 the casing itself is not normally displaced. Thus, if a casing having a printed indicating stripe extending longitudinally of it were shirred on a conventional apparatus, the shirred strand 149 would appear as shown in FIG. 5 with the stripe extending in a straight line along the surface of the strand.

The shirred casing 149 which leaves shirring wheels 138 is compacted against the holdback device 150 which moves slowly along beam 105 away from shirring wheels 138. The rate of movement of holdback device 150 is somewhat slower than the rate of discharge of shirred casing from shirring wheels 138 with the result that the casing is slightly compressed by the shirring wheels against the holdback mechanism. Holdback mechanism 150 is provided with rubber drive rolls 175, 176 and 177 which are held in engagement with the surface of the shirred casing 149 as shown in FIG. 3. Rubber drive rolls 175, 176 and 177 are driven by motor 184, speed reducer 183, and the system of pulleys and drive belt 181. The rubber drive rolls are operable to turn the shirred casing at a predetermined rate of speed. The turning of the casing by the drive rolls causes the casing to be continually displaced at the point of shirring, i.e., between the shirring wheels 138. This causes a continuous rotation of the casing during shirring so that the helical shirring pattern of pleats is further displaced helically around the shirred strand. The rotation of the shirred strand during shirring causes irregularities in the casing to be displaced circumferentially around the shirred strand with the result that any irregularities are evenely positioned about the strand and the resulting shirred and compressed strand will be straight regardless of variations in thickness of the casing wall or variations in the relationship of the shirring mandrel and the shirring wheels.

It has been found with ordinary shirring equipment not utilizing this casing turning device that a slight misalignment of the mandrel in relation to the shirring wheels or the presence of irregularities in wall thickness of the casing will result in off center shirring with pleats being heavier along one side of the shirred strand than along another side. Such a variation in shirring pattern results in the production of a shirred strand which is bowed rather than one which is straight. A bowed strand of shirred casing can be used in many applications but is completely useless in sausage stuffing machinery having automatic feeding and handling features. It has also been found that when casing is shirred which has printing extending longitudinally thereof the added thickness of the printing ink causes the production of a bowed strand of shirred casing. By using the apparatus shown in FIGS. 1 to 4 it is possible to rotate the casing while it is being shirred at a high enough rate of speed to displace irregularities around the strand and produce a straight strand of casing regardless of the type of irregularity encountered. This apparatus is especially useful in the shirring of printed casing since the printed subject matter will be spiraled around the casing along with the production of the shirred pleat pattern with the result that there is no tendency to produce a bowed strand. In FIG. 6 of the drawing a shirred strand 149 is shown as it would appear when produced on this apparatus with the printed matter or identifying stripe twisted into a relatively tight spiral around the shirred strand of casing.

When the apparatus has been operated for a time sufficient to shirr a predetermined length of casing the shirring wheels stop and pneumatic actuators 191 and 192 open the holdback device to the position shown in FIG. 4 so that the shirred casing may be moved past it. At this point in the operation, the shirred strand of casing is severed from the unshirred casing adjacent the shirring wheels 138 and is moved past the opened holdback device to clamps 151. Clamps 151 are then opened and the shirred strand is moved to a position where it can be compressed by compression member 159. At this point, compression member 159 is moved to the right until member 160 can engage the right hand end of shirred strand 149. Holdback device 150 is also moved to the right until it engages the casing coming out of shirring wheels 138. Clamps 151 are closed and the apparatus is ready to operate further. With further operation of the apparatus additional casing is shirred by shirring wheels 138 and continually twisted by the drive rolls on holdback device 150. Simultaneously, member 159 is compressing a previously shirred strand 149 against clamps 153. When the compression against clamps 153 is complete, the clamps 153 may be opened and the shirred and compressed strand removed from the apparatus.

In the normal operation of the apparatus shown in FIG. 1 of the drawings without the rotary holdback mechanism 150 it was noted that twisted shirred strands of casing would often be produced. The twisted strands which were produced would have approximately one complete twist impressed upon the normal shirring pattern in a 15 to 30 in. compressed shirred strand. This amount of twist in the strand was ineffective for the purpose of overcoming irregularities in the alignment of the shirring apparatus and particularly for overcoming irregularities in the casing such as an added wall thickness of the type encountered where printed casings are shirred. When this apparatus was first designed and operated it was found that a relatively high degree of twist is necessary in the shirred strand of casing in order to overcome irregularities in shirring machine alignment and irregularities in casing wall thickness completely. Thus, to shirr casing having longitudinal printing thereon, it is necessary to have from 0.5–10 turns per in. of shirred and compressed casing impressed upon the shirring pattern by the operation of the drive wheels 175, 176 and 177 in holdback mechanism 150. A shirred product having 0.5–10 turns per in. of shirred and compressed casing impressed upon the shirring pattern has not been produced by any other known mechanism for retarding and rotating a shirred strand of casing during the shirring operation. Furthermore, the presence of a twist in the casing of 0.5–10 turns per in. (preferably about 1 to 2 turns per in.) of shirred and compressed casing is necessary to the shirring of casing having irregularities in wall thickness, particularly a uniform irregularity of the type encountered in casing having printing running longitudinally thereof. In the preferred range of twist of the casing, viz., 1 to 2 turns of casing per in. of shirred and compressed casing, the amount of twist in relation to the shirred casing pattern is relatively critical since a higher degree of twist of the shirred casing results in a somewhat weakened structure to the shirred strand while a lesser degree of twist is insufficient to overcome completely the bowing of the casing which is encountered in the shirring of printed casing. Thus, while a degree of twist of 0.5 to 10 turns per in. of shirred and compressed casing is satisfactory for eliminating bowing in the production of shirred casing due to shirring machine misalignment, a degree of twist of 1 to 2 turns per in. of shirred and compressed casing is preferred for producing a strong tightly locked pleat pattern in the shirring of printed casing.

While this apparatus has been described fully and completely as applied to one particular type of shirring machine it should be understood that the strand rotating and holdback mechanism 150 can be adapted to other types of shirring machines such as the machines shown and described in the Dietrich, Korsgaard, Blizzard et al., Matecki, Gimbel, and Ives shirring patents. It should therefore be apparent to those skilled in the art that within the scope of the appended claims the invention may be practiced otherwise than as specifically described herein.

What is claimed is:

1. A machine for shirring flexible casing including a mandrel over which inflated casing is passed and means to indent and compress the inflated casing into an ordered pattern of shirred pleats and rotatable means to engage the shirred casing and rotate the same about said mandrel.

2. A machine as defined in claim 1 in which said rotatable means includes holdback means engageable with the end of the shirred casing opposite the casing indenting means to resist movement of the shirred casing along the mandrel and cause the same to be compacted.

3. A machine as defined in claim 1 in which said casing rotating means comprises one or more resilient drive rolls engageable with the shirred casing to rotate the same.

4. A machine as defined in claim 3 in which said rotatable means includes holdback means engageable with the end of the shirred casing opposite the casing indenting means to resist movement of the shirred casing along the mandrel and cause the same to be compacted.

5. A machine as defined in claim 4 in which said holdback means and said drive rolls are movable pivotally in relation to said mandrel to permit movement of shirred casing therebeyond, and means to move said drive rolls and said holdback means pivotally toward and away from said mandrel.

6. A machine as defined in claim 5 in which said holdback means comprises a split collar movable into and out of closed position around said mandrel, said split collar fitting against said mandrel with a clearance less than the thickness of the wall of the casing being shirred.

7. A machine as defined in claim 5 including a carriage supporting said holdback means and said drive rolls for movement longitudinally of said mandrel.

References Cited

UNITED STATES PATENTS

| | | | |
|---|---|---|---|
| 2,983,949 | 5/1961 | Matecki | 17—42 |
| 3,110,058 | 11/1963 | Marbach | 17—42 |
| 3,397,069 | 8/1968 | Urbutis et al. | 17—42 X |

LUCIE H. LANDENSLAGER, Primary Examiner

U.S. Cl. X.R.

99—176

Notice of Adverse Decision In Interference

In Interference No. 97,410 involving Patent No. 3,454,981, T. W. Martinek, SHIRRING APPARATUS AND RESULTING PRODUCT, final judgment adverse to the patentee was rendered July 27, 1972, as to claims 1 and 2.

[*Official Gazette January 16, 1973.*]